US012586236B2

(12) United States Patent　　　(10) Patent No.:　US 12,586,236 B2
Kuo et al.　　　　　　　　　　　(45) Date of Patent:　　Mar. 24, 2026

(54) LOCALIZATION OF OBJECTS ENCODED IN IMAGE DATA IN ACCORDANCE WITH NATURAL LANGUAGE QUERIES

(71) Applicant: Google LLC, Mountain View, CA (US)

(72) Inventors: Wei-Cheng Kuo, Santa Clara, CA (US); Fred Bertsch, Belmont, CA (US); Wei Li, Fremont, CA (US); Anthony J. Piergiovanni, Denver, CO (US); Mohammad Taghi Saffar, Santa Clara, CA (US); Anelia Angelova, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 478 days.

(21) Appl. No.: 18/173,557

(22) Filed: Feb. 23, 2023

(65) Prior Publication Data

US 2024/0289981 A1　　Aug. 29, 2024

(51) Int. Cl.
　*G06T 7/73*　　　　(2017.01)
　*G06F 40/126*　　　(2020.01)
　　　　　(Continued)

(52) U.S. Cl.
　CPC .............. *G06T 7/73* (2017.01); *G06F 40/126* (2020.01); *G06F 40/40* (2020.01); *G06V 10/7715* (2022.01); *G06V 10/806* (2022.01)

(58) Field of Classification Search
　CPC ............. G06T 7/73; G06T 2207/20081; G06T 2207/20084; G06T 2207/20092;
　　　　　　(Continued)

(56) References Cited

U.S. PATENT DOCUMENTS

| 12,045,288 B1 * | 7/2024 | Barut | G06F 16/532 |
| 2023/0305863 A1 * | 9/2023 | Riva | G06F 40/284 |
| 2024/0013504 A1 * | 1/2024 | Yu | G06V 10/80 |

FOREIGN PATENT DOCUMENTS

| WO | WO2022250745 | * 12/2022 | G06N 3/04 |
| WO | WO2023125335 | * 7/2023 | G06F 40/35 |
| WO | WO2023201990 | * 10/2023 | G06T 5/70 |

OTHER PUBLICATIONS

Anderson et al., "Bottom-Up and Top-Down Attention for Image Captioning and Visual Question Answering.", arXiv:1707.07998v3, Mar. 14, 2018, 15 pages.

(Continued)

*Primary Examiner* — Jerome Grant, II

(74) *Attorney, Agent, or Firm* — DORITY & MANNING P.A.

(57)　　　　　ABSTRACT

Generally, the disclosure is directed to generalized objected location, where the located object is in accordance to a natural language (NL) query. More specifically, the embodiments include a unified generalized visual localization architecture. The architecture achieves enhanced performance on the following three tasks: referring expression comprehension, object localization, and object detection. The embodiments employ machine-learned NL models and/or image models. The architecture is enabled to understand and answer natural localization questions towards an image, to output multiple boxes, provide no output if the object is not present (e.g., a null result), as well as, solve general detection tasks.

19 Claims, 8 Drawing Sheets

(51) Int. Cl.
    *G06F 40/40* (2020.01)
    *G06V 10/77* (2022.01)
    *G06V 10/80* (2022.01)
(58) Field of Classification Search
    CPC ... G06F 40/126; G06F 40/40; G06V 10/7715;
        G06V 10/806; G06V 10/454; G06V 10/82
    USPC ........................................................ 382/103
    See application file for complete search history.

(56)  References Cited

OTHER PUBLICATIONS

Basal et al., "Zero-Shot Object Detection.", arXiv:1804.04340v2, Jul. 27, 2018, 17 pages.
Carion et al., "End-to-End Object Detection with Transformers.", arXiv:2005.12872v3, May 28, 2020, 26 pages.
Changpinyo et al., "Conceptual 12M: Pushing Web-Scale Image-Text Pre-Training to Recognize Long-Tail Visual Concepts.", arXiv:2102.08981v2, Mar. 30, 2021, 16 pages.
Changpinyo et al., "Telling the What While Pointing to the Where: Multimodal Queries for Image Retrieval.", arXiv:2102.04980v3, 15 pages.
Chen et al., "Cops-Ref: A New Dataset and Task on Compositional Referring Expression Comprehension.", arXiv:2003.00403v1, Mar. 1, 2020, 10 pages.
Chen et al., "Microsoft COCO Captions: Data Collection and Evaluation Server.", arXiv:1504.00325v2, Apr. 3, 2015, 7 pages.
Chen et al., "Real-Time Referring Expression Comprehension by Single-Stage Grounding Network.", arXiv:1812.03426v1. Dec. 9, 2018, 16 pages.
Chen et al., "UNITER: UNiversal Image-TExt Representation Learning,", arXiv:1909.11740v3, Jul. 17, 2020, 26 pages.
Cho et al., "Unifying Vision-and-Language Tasks via Text Generation.", arXiv:2102.02779v2, May 23, 2021, 15 pages.
Das et al., "Visual Dialog.", arXiv:1611.08669v5, Aug. 1, 2017, 23 pages.
Deng et al., "Trans VG: End-to-End Visual Grounding with Transformers.", arXiv:2104.08541v4. Jan. 14, 2022, 11 pages.
Desai et al., "VirTex: Learning Visual Representations from Textual Annotations.", arXiv:2006.06666v3, Sep. 25, 2021, 17 pages.
Dhamija et al., "The Overlooked Elephant of Object Detection: Open Set.", Institute of Electrical and Electronics Engineers/ Computer Vision Foundation Winter Conference on Applications of Computer Vision, Seattle, Washington, United States, Jun. 13-19, 2020, pp. 1021-1030.
Gan et al., "Large-Scale Adversarial Training for Vision-and-Language Representation Learning.", arXiv:2006.06195v2. Oct. 22, 2020, 16 pages.
Gan et al., "VQS: Linking Segmentations to Questions and Answers for Supervised Attention in VQA and Question-Focused Semantic Segmentation.", arXiv:1708.04686v1, 12 pages.
Girsbick et al., "Detectron.", retrieved on May 10, 2023, https://github.com/facebookresearch/Detectron, 2018, 5 pages.
Girshick et al., "Rich Feature Hierarchies for Accurate Object Detection and Semantic Segmentation.", 2014 Institute of Electrical and Electronics Engineers Conference on Computer Vision and Pattern Recognition, Columbus, Ohio, United States, Jun. 23-28, 2014, 8 pages.
Gu et al., "Open-vocabulary Object Detection via Vision and Language Knowledge Distillation.", arXiv:2104.13921v3, May 12, 2022, 21 pages.
Gupta et al., "Contrastive Learning for Weakly Supervised Phrase Grounding.", arXiv:2006.09920v3, Aug. 5, 2020, 18 pages.
Gupta et al., "Towards General Purpose Vision Systems.", arXiv:2104.00743v2, Apr. 19, 2022, 13 pages.
He et al., "Mask R-CNN.", Jan. 24, 2018, 12 pages.
Hinami et al., "Discriminative Learning of Open-Vocabulary Object Retrieval and Localization by Negative Phrase Augmentation", arXiv:1711.09509v2, Sep. 4, 2018, 19 pages.

Hong et al., "Learning to Compose and Reason with Language Tree Structures for Visual Grounding.", arXiv:1906.01784v1, Jun. 5, 2019, 14 pages.
Hu et al., "Modeling Relationships in Referential Expressions with Compositional Modular Networks.", arXiv:1611.09978v1, Nov. 30, 2016, 11 pages.
Hu et al., "Natural Language Object Retrieval.", arXiv:1511.04164v3, Apr. 11, 2016, 14 pages.
Hu et al., "Segmentation from Natural Language Expressions.", arXiv:1603.06180v1, Mar. 20, 2016, 25 pages.
Hu et al., "UniT: Multimodal Multitask Learning with a Unified Transformer.", arXiv:2102.10772v3, Aug. 18, 2021, 16 pages.
Huang et al., "Multimodal Pretraining for Dense Video Captioning.", First Conference of the Asia-Pacific Chapter of the Association for Computational Linguistics and the Tenth International Joint Conference on Natural Language Processing, Suzhou, China, Dec. 2020, pp. 470-490.
Huang et al., "Seeing Out of tHe bOx: End-to-End Pre-training for Vision-Language Representation Learning.", arXiv:2104.03135v2, Apr. 8, 2021, 13 pages.
Hudson et al., "GQA: A New Dataset for Real-World Visual Reasoning and Compositional Question Answering.", arXiv:1902.09506v3, May 10, 2019, 18 pages.
Jia et al., "Scaling Up Visual and Vision-Language Representation Learning with Noisy Text Supervision.", arXiv:2102.05918v2, Jun. 11, 2021, 14 pages.
Jiang et al., "In Defense of Grid Features for Visual Question Answering.", arXiv:2001.03615v2, Apr. 2, 2020, 12 pages.
Johnson et al., "CLEVR: A Diagnostic Dataset for Compositional Language and Elementary Visual Reasoning.", arXiv:1612.06890v1, Dec. 20, 2016, 17 pages.
Jun et al., "MSR-VTT: A Large Video Description Dataset for Bridging Video and Language.", 2016 Institute of Electrical and Electronics Engineers Conference on Computer Vision and Pattern Recognition, Las Vegas, Nevada, United States, Jun. 27-30, 2016, 9 pages.
Kamath et al., "MDETR—Modulated Detection for End-to-End Multi-Modal Understanding.", arXiv:2104.12763v2. Oct. 12, 2021, 22 pages.
Kant et al., "Contrast and Classify: Training Robust VQA Models.", arXiv:2010.06087v2, Apr. 19, 2021, 22 pages.
Kazemzadeh et al., "ReferItGame: Referring to Objects in Photographs of Natural Scenes.", 2014 Conference on Empirical Methods in Natural Language Processing, Doha, Qatar, Oct. 25-29, 2014, pp. 787-798.
Kim et al., "ViLT: Vision-and-Language Transformer Without Convolution or Region Supervision.", arXiv:2102.03334v2, Jun. 10, 2021, Jun. 10, 2021, 12 pages.
Krishna et al., "Visual Genome: Connecting Language and Vision Using Crowdsourced Dense Image Annotations.", arXiv:1602.07332v1, Feb. 23, 2016, 44 pages.
Kudo et al., "SentencePiece: A Simple and Language Independent Subword Tokenizer and Detokenizer for Neural Text Processing.", arXiv:1808.06226v1, Aug. 19, 2018, 6 pages.
Li et al., "Grounded Language-Image Pre-training.", arXiv:2112.03857v2, Jun. 17, 2022, 20 pages.
Li et al., "Oscar: Object-Semantics Aligned Pre-training for Vision-Language Tasks.", arXiv:2004.06165v5, Jul. 26, 2020, 21 pages.
Li et al., "VisualBERT: A Simple and Performant Baseline for Vision and Language.", arXiv:1908.03557v1, Aug. 9, 2019, 14 pages.
Liao et al., "A Real-Time Cross-Modality Correlation Filtering Method for Referring Expression Comprehension.", arXiv:1909.07072v4, Apr. 27, 2020, 10 pages.
Lin et al., "Feature Pyramid Networks for Object Detection.", arXiv:1612.03144v2, Apr. 19, 2017, 10 pages.
Lin et al., "Focal Loss for Dense Object Detection.", arXiv:1708.02002v2, Feb. 7, 2018, 10 pages.
Lin et al., "Microsoft COCO: Common Objects in Context.", arXiv:1405.0312v3, Feb. 21, 2015, 15 pages.
Lin et al., "VX2TEXT: End-to-End Learning of Video-Based Text Generation from Multimodal Inputs.", arXiv:2101.12059v2, Jan. 29, 2021, 14 pages.

(56) References Cited

OTHER PUBLICATIONS

Liu et al., "Improving Referring Expression Grounding with Cross-modal Attention-guided Erasing.", arXiv:1903.00839v2, Apr. 2, 2019, 10 pages.

Liu et al., "Learning to Assemble Neural Module Tree Networks for Visual Grounding.", arXiv:1812.03299v3, Oct. 21, 2019, 14 pages.

Liu et al., "LocTex: Learning Data-Efficient Visual Representations from Localized Textual Supervision.", arXiv:2108.11950v1, Aug. 26, 2021, 13 pages.

Liu et al., "Recurrent Multimodal Interaction for Referring Image Segmentation.", arXiv:1703.07939v2. Aug. 4, 2017, 10 pages.

Lu et al., "12-in-1: Multi-Task Vision and Language Representation Learning.", arXiv:1912.02315v2, Apr. 24, 2020, 19 pages.

Lu et al., "ViLBERT: Pretraining Task-Agnostic Visiolinguistic Representations for Vision-and-Language Tasks.", arXiv:1908.02265v1, Aug. 6, 2019, 11 pages.

Luo et al., "Multi-task Collaborative Network for Joint Referring Expression Comprehension and Segmentation.", arXiv:2003.08813v1, Mar. 19, 2020, 10 pages.

Mao et al., "Generation and Comprehension of Unambiguous Object Descriptions.", arXiv:1511.02283v3. Apr. 11, 2016, 11 pages.

Margffoy-Tuay et al., "Dynamic Multimodal Instance Segmentation Guided by Natural Language Queries.", arXiv:1807.02257v2, Jul. 22, 2018, 16 pages.

Nagaraja et al., "Modeling Context Between Objects for Referring Expression Understanding.", arXiv:1608.00525v1, Aug. 1, 2016, 16 pages.

Ordonez et al., "Im2Text_ Describing Images Using 1 Million Captioned Photographs.", Advances in Neural Information Processing Systems 24, Granada, Spain, Dec. 12-17, 2011, 9 pages.

Papageorgiou et al., "A General Framework for Object Detection.", Sixth International Conference on Computer Vision, Bombay, India, Jan. 4-7, 1998, 8 pages.

Peng et al., "Large-Scale Object Detection in the Wild from Imbalanced Multi-Labels.", arXiv:2005.08455v1, May 18, 2020, 10 pages.

Plummer et al., "Flickr30k Entities: Collecting Region-to-Phrase Correspondences for Richer Image-to-Sentence Models.", arXiv:1505.04870v4. Sep. 19, 2016, 22 pages.

Plummer et al., "Revisiting Image-Language Networks for Open-ended Phrase Detection.", arXiv:1811,07212v3, Oct. 12, 2020, 12 pages.

Qiao et al., "Referring Expression Comprehension: A Survey of Methods and Datasets.", arXiv:2007.09554v2, Dec. 7, 2020, 15 pages.

Radford et al., "Learning Transferable Visual Models from Natural Language Supervision.", arXiv:2103.00020v1. Feb. 26, 2021, 48 pages.

Raffel et al., "Exploring the Limits of Transfer Learning with a Unified Text-to-Text Transformer.", arXiv:1910.10683v3. Jul. 28, 2020, 67 pages.

Redmon et al., "You Only Look Once: Unified, Real-Time Object Detection.", arXiv:1506.02640v5, May 9, 2016, 10 pages.

Ren et al., "Faster R-CNN: Towards Real-Time Object Detection with Region Proposal Networks.", arXiv:1506.01497v3, Jan. 6, 2016, 14 pages.

Rowley et al., "Human Face Detection in Visual Scenes.", Advances in Neural Information Processing Systems 8 (NIPS 1995), Denver, Colorado, United States, Nov. 27-Dec. 2, 1995, 7 pages.

Shao et al., "Objects365: A Large-scale, High-quality Dataset for Object Detection", Institute of Electrical and Electronics Engineers/Computer Vision Foundation International Conference on Computer Vision, Seoul, Korea, Oct. 27-Nov. 2, 2019, pp. 8430-8439.

Srinivasan et al., "WIT: Wikipedia-based Image Text Dataset for Multimodal Multilingual Machine Learning.", arXiv:2103.01913v2, Mar. 3, 2021, 16 pages.

Suhr et al., "A Corpus of Natural Language for Visual Reasoning.", Fifty-fifth Annual Meeting of the Association for Computational Linguistics, Vancouver, Canada, Jul. 30-Aug. 4, 2017, pp. 217-223.

Tan et al., "LXMERT: Learning Cross-Modality Encoder Representations from Transformers.", 2019 Conference on Empirical Methods in Natural Language Processing and the Ninth International Joint Conference on Natural Language Processing (EMNLP-IJCNLP), Hong Kong, China, Nov. 3-7, 2019, pp. 5100-5111.

Vaillant et al., "An Original Approach for the Localization of Objects in Images.", Third International Conference on Artificial Neural Networks, Brighton, England, United Kingdom, May 25-27, 1993, pp. 26-30.

Vaswani et al., "Attention Is All You Need.", arXiv:1706.03762v5, Dec. 6, 2017, 15 pages.

Viola et al., "Robust Real-Time Object Detection.", Eighth Institute of Electrical and Electronics Engineers International Conference on Computer Vision, Vancouver, British Columbia, Canada, Jul. 7-14, 2001, 1 page.

Wang et al., "Learning Two-Branch Neural Networks for Image-Text Matching Tasks.", arXiv:1704.03470v4, May 1, 2018, 14 pages.

Wang et al., "Neighbourhood Watch: Referring Expression Comprehension via Language-guided Graph Attention Networks,", arXiv:1812.04794v1, Dec. 12, 2018, 9 pages.

Wang et al., "Structured Matching for Phrase Localization.", Fourteenth Annual European Conference on Computer Vision, Amsterdam, Netherlands, Oct. 8-16, 2016, 16 pages.

Xian et al., "Zero-Shot Learning—A Comprehensive Evaluation of the Good, the Bad and the Ugly.", arXiv:1707.00600v4, Sep. 23, 2020, 14 pages.

Xie et al., "Visual Entailment: A Novel Task for Fine-Grained Image Understanding.", arXiv:1901.06706v1, Jan. 20, 2019, 12 pages.

Xu et al., "E2E-VLP: End-to-End Vision-Language Pre-training Enhanced by Visual Learning.", arXiv:2106.01804v2. Jun. 4, 2021, 11 pages.

Yang et al., "A Fast and Accurate One-Stage Approach to Visual Grounding.", arXiv:1908.06354v1, Aug. 18, 2019, 13 pages.

Yang et al., "Dynamic Graph Attention for Referring Expression Comprehension.", arXiv:1909.08164v1, Sep. 18, 2019, 10 pages.

Yang et al., "Improving One-stage Visual Grounding by Recursive Sub-query Construction.", arXiv:2008.01059v1, Aug. 3, 2020, 21 pages.

Yu et al., "ERNIE-ViL: Knowledge Enhanced Vision-Language Representations through Scene Graphs.", Thirty-Fifth Association for the Advancement of Artificial Intelligence Conference on Artificial Intelligence, Virtual, Feb. 2-9, 2021, 9 pages.

Yu et al., "MAttNet: Modular Attention Network for Referring Expression Comprehension.", arXiv:1801.08186v3, Mar. 27, 2018, 15 pages.

Yu et al., "Modeling Context in Referring Expressions.", arXiv:1608.00272v3, Aug. 10, 2016, 19 pages.

Zellers et al., "From Recognition to Cognition: Visual Commonsense Reasoning.", arXiv:1811.10830v2, Mar. 26, 2019, 29 pages.

Zhang et al., "Grounding Referring Expressions in Images by Variational Context.", arXiv:1712.01892v2. Mar. 31, 2018, 12 pages.

Zhang et al., "VinVL: Revisiting Visual Representations in Vision-Language Models.", arXiv:2101.00529v2, Mar. 10, 2021, Mar. 10, 2021, 30 pages.

Zhao et al., "Weakly Supervised Phrase Localization with Multi-Scale Anchored Transformer Network.", 2018 Institute of Electrical and Electronics Engineers/Computer Vision Foundation Conference on Computer Vision and Pattern Recognition, Salt Lake City, Utah, United States, Jun. 18-22, 2018, pp. 5696-5705.

Zhou et al., "Unified Vision-Language Pre-Training for Image Captioning and VQA.", Thirty-Fourth Association for the Advancement of Artificial Intelligence Conference on Artificial Intelligence (AAAI-20), vol. 34, No. 07, New York, New York, Feb. 7-12, 2020, 9 pages.

Zhu et al., "Zero-Shot Detection.", arXiv:1803.07113v2, Mar. 19, 2019, 13 pages.

Zhuang et al., "Parallel Attention: A Unified Framework for Visual Object Discovery through Dialogs and Queries.", arXiv:1711.06370v1, Nov. 17, 2017, 11 pages.

* cited by examiner

400

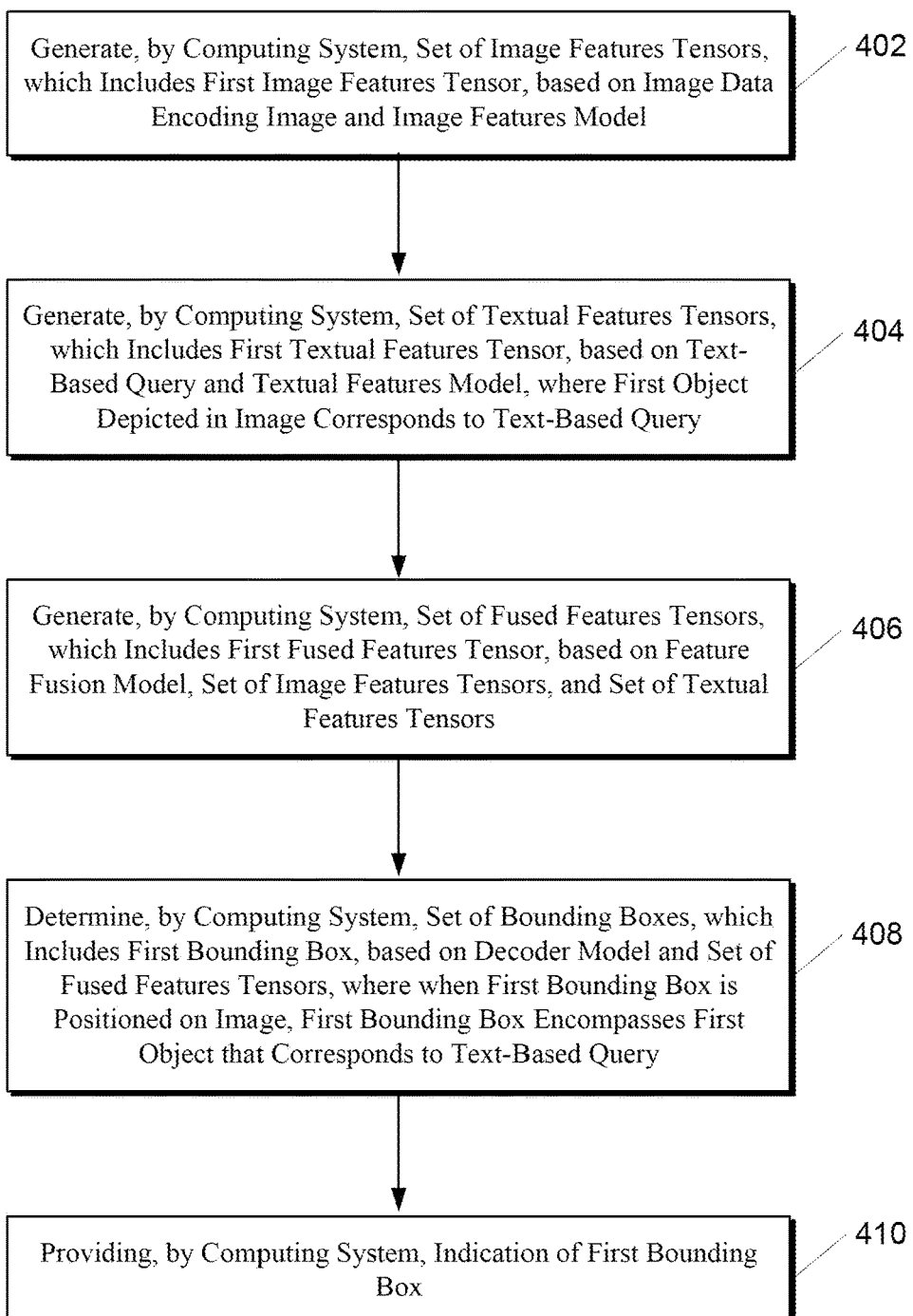

Generate, by Computing System, Set of Image Features Tensors, which Includes First Image Features Tensor, based on Image Data Encoding Image and Image Features Model — 402

Generate, by Computing System, Set of Textual Features Tensors, which Includes First Textual Features Tensor, based on Text-Based Query and Textual Features Model, where First Object Depicted in Image Corresponds to Text-Based Query — 404

Generate, by Computing System, Set of Fused Features Tensors, which Includes First Fused Features Tensor, based on Feature Fusion Model, Set of Image Features Tensors, and Set of Textual Features Tensors — 406

Determine, by Computing System, Set of Bounding Boxes, which Includes First Bounding Box, based on Decoder Model and Set of Fused Features Tensors, where when First Bounding Box is Positioned on Image, First Bounding Box Encompasses First Object that Corresponds to Text-Based Query — 408

Providing, by Computing System, Indication of First Bounding Box — 410

LOCALIZATION OF OBJECTS ENCODED IN IMAGE DATA IN ACCORDANCE WITH NATURAL LANGUAGE QUERIES

FIELD

The present disclosure relates generally to image processing. More particularly, the present disclosure relates to localization of objects encoded in image data in accordance with natural language (NL) queries.

BACKGROUND

Natural language enables flexible, expressive queries about images. Grounding natural queries to regions in an image facilitates a system's understanding of relationships between objects, human intentions about objects, and real interactions with environments. The problem of visual grounding problem has been studied through many tasks such as phrase grounding, object retrieval and localization, language-driven instance segmentation, and the like. Among the most popular image-language visual grounding tasks is a referring expression comprehension task, which aims to localize an object, given a referring text.

A related semantic task is object detection, which may be instrumental in driving progress in 3D perception, video action recognition, robot vision, and other computer vision tasks. For object detection, the goal includes detection of all objects from a predefined set of classes. Text is not used to prompt for specific object(s), thus the detection task has customarily been studied independently of visual grounding. At the intersection of referring expression comprehension and detection is text-based localization. Object localization may be initiated by a simple category-based text query.

SUMMARY

Aspects and advantages of embodiments of the present disclosure will be set forth in part in the following description, or can be learned from the description, or can be learned through practice of the embodiments.

One example aspect of the present disclosure is directed to computer-implemented method for the localization of objects encoded in image data in accordance with natural language queries. The method may include a computing system generating a set of image features tensors. The set of image features may include at least a first image features tensor. Generating the set of image features tensors may be based on image data encoding an image and an image features model. The computing system may generate a set of textual features tensors. The set of textual features may include at least a first textual features tensor. Generating the set of textual features may be based on a text-based query and a textual features model. The computing system may generate a set of fused features tensors. The set of fused features tensors may include at least a first fused features tensor. Generating the set of fused features tensors may be based on a feature fusion model, the set of image features tensors, and the set of textual features tensors. The computing system may determine a set of bounding boxes. The set of bounding boxed may include at least a first bounding box. Determining the set of bounding boxes may be based on a decoder model and the set of fused features tensors. When the first bounding box is positioned on the image, the first bounding box may encompass the first object that corresponds to the text-based query. The computing system may provide an indication of at least the first bounding box.

Another example aspect of the present disclosure is directed to a computing system. The computing system may include one or more processors and one or more non-transitory computer-readable media that store instructions. When the instructions are executed are executed by the one or more processors, the computer system is caused to perform operations. The operations may perform any of the various methods discussed herein.

Another example aspect of the present disclosure is directed to one or more tangible non-transitory computer-readable media storing computer-readable instructions. When the instructions are executed by one or more processors, the one or more processors are caused to perform operations. The operations may perform any of the various methods discussed herein.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 depicts a flow chart diagram of an example method to perform localization of objects encoded in accordance with natural language queries, according to example embodiments of the present disclosure.

Figure 1A:
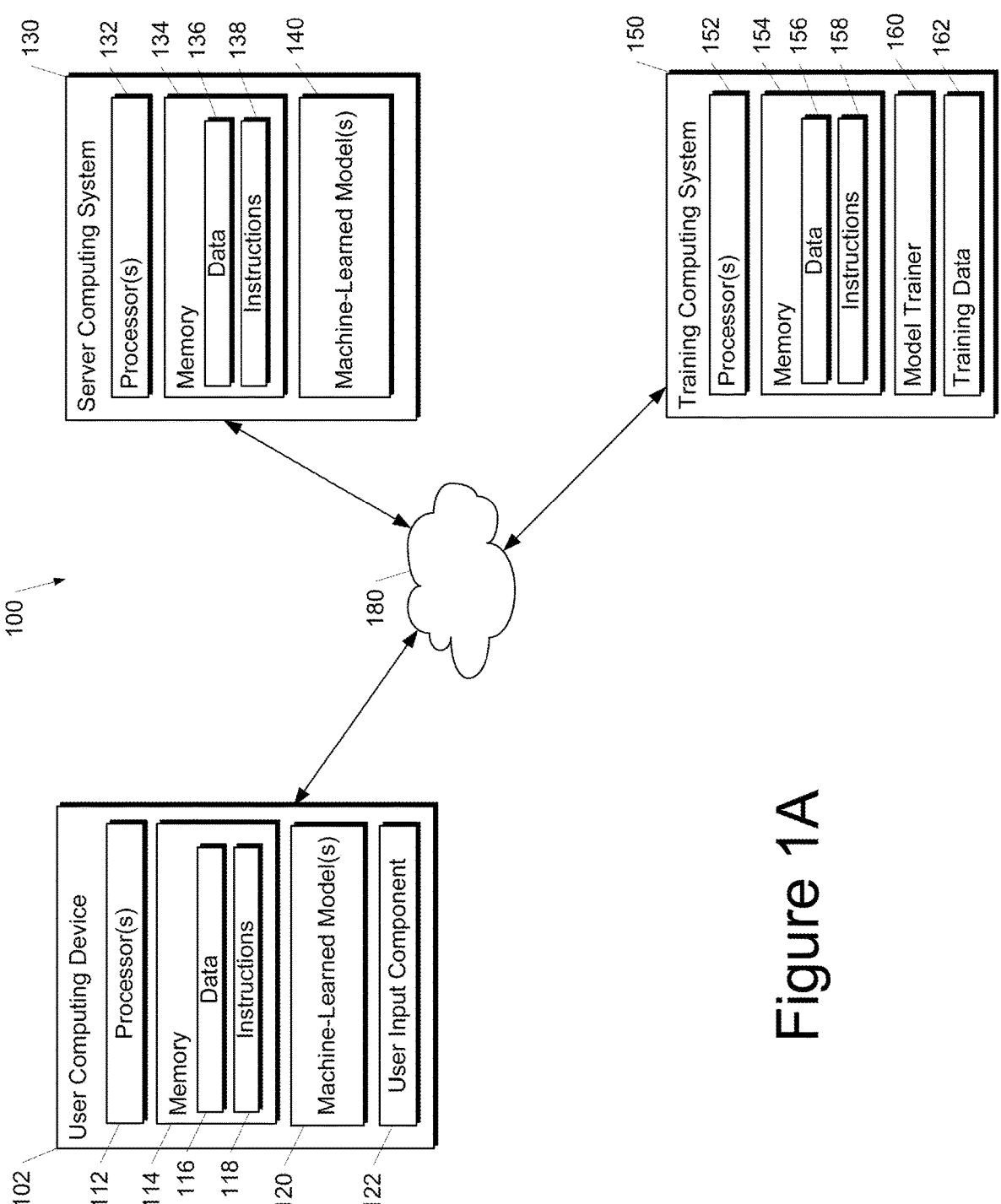
FIG. 1A depicts a block diagram of an example computing system that performs localization of objects encoded in image data in accordance with natural language queries according to example embodiments of the present disclosure.

Reference numerals that are repeated across plural figures are intended to identify the same features in various implementations.

DETAILED DESCRIPTION

Overview

Generally, the present disclosure is directed to generalized object location (e.g., within image data), where the located object is in accordance to a natural language (NL) query. More specifically, the embodiments include a unified generalized visual localization framework and/or architecture, referred to throughout as an object localization system (OLS). The approach presented herein (e.g., the OLS framework and/or the architecture included in the various embodiments) achieves enhanced performance on at least the following three tasks: referring expression comprehension, object localization, and object detection. The embodiments employ various enhanced machine-learned NL models and/or image models. The OLS framework has the ability to understand and answer natural localization questions towards an image, to output multiple boxes, provide no output if the object is not present (e.g., a null result), as well as, solve general detection tasks. The enhanced models of the embodiments include a multi-level image-text feature fusion which handles multiscale objects and complex expressions better than other object localization mechanisms. The image-text feature fusion of some embodiments combines the advantages from both (e.g., image features and text features) visual and language models by applying cross-attention (e.g., across the image and text features) at various scales to enable richer image-text interaction. The cross-attention in some embodiments may be important for some tasks, e.g. referring expressions that might not consider objects at a wide variety of scales. Furthermore, compared with other models on referring expressions, the embodiments employ a simple architecture and losses and apply a combined architecture to solve all three tasks (alone and jointly), which does not use pre-computed boxes.

The embodiments may be employed in various applications. For instance, an OLS may be utilized in an image recognition pipeline. The embodiments may be employed in various end-user applications, such as an image search engine that is enabled to search over photo galleries and/or video repositories. In at least one embodiment, once an object depicted in an image has been localized, an OLS may provide a bounding box embedded within the image. The bounding box may surround an object that is in accordance with a search query. The bounding box may be selectable by an end-user (e.g., that bounding box may be selected via a click). Once selected, the bounding box may be employed to crop the image and/or limit the portion of the image for additional searches.

The ability to localize image regions from NL queries is integral to vision and language understanding. Other methods approach object localization via NL queries through a variety of separate tasks. As discussed below, at least due to the separateness of these tasks, these other methods may not achieve the intended results. The various embodiments include a general framework (e.g., the OLS framework) that enables multiple semantic localization tasks including referring expression comprehension, text localization, and detection. The embodiments employ a multiscale image-text fusion module that localizes objects of various scales across a variety of tasks. Some embodiments use detection losses. The embodiments handle expressions referring to zero, one, or multiple objects (e.g., depicted and/or encoded within image data). The embodiments achieve enhanced performance on novel vocabulary (e.g. super-categories).

Since visual grounding and detection have traditionally been separated into different tasks, progress in generalized object location via NL queries has been slow. For instance, progress in visual grounding and detection have been prevented from taking advantage of each other's strengths. For example, referring expression comprehension tasks can have any category occur in the natural language query, by definition, but may be limited to a single box output, whereas detection tasks may be able to localize multiple objects of diverse categories per image, but work with a fixed set of categories and cannot be used with text. Importantly, each task separately might be unsuccessful at the other highly semantically related task. Namely, while achieving high success rates in referring expressions comprehension on the standard benchmarks, some other models might have a rather limited understanding of what is in the image. For example, when asking for a missing object, even from a well-known and understood category (e.g., a car), other models may erroneously point to a person. The referring comprehension task also imposes an implicit requirement to have a referring expression to a single object, rather than any free form guiding text which can be issued towards an image. For example, a standard localization task such as "Find the dogs" should be straightforward to answer, but other models routinely fail at such standard tasks. Standard detection tasks, which in principle can answer these questions, that are implemented by other models may require additional text parsing and postprocessing to do so. Furthermore, the generalization ability of the referring comprehension models is limited in other models, possibly due to overfitting to the questions and data, or due to operating on the most prominent objects in the image, or objects of the same scale. For example, when issuing questions from the same dataset but on relevant images from another dataset, e.g. on out-of-distribution (OOD) data, other models may be unable to answer correctly.

Aspects of the present disclosure provide a number of technical effects and benefits over the other methods discussed above. For instance, the OLS framework (or approach) is a general framework for semantic localization tasks including the referring expression (e.g., the query) comprehension, text localization, and object detection. The embodiments achieve enhanced performance on these tasks. The OLS architecture achieves enhanced performance on all three above mentioned tasks with a multiscale image-language fusion to address localization across different scales. The OLS architecture may be easy adapted to other vision-language tasks. The various embodiments are enabled to handle questions referring to zero, one, or many objects, and the embodiments work well with out-of-distribution data and unseen classes.

With reference now to the Figures, example embodiments of the present disclosure will be discussed in further detail.
Example Devices and Systems FIG. 1A depicts a block diagram of an example computing system 100 that performs object localization via queries according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a object localization service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
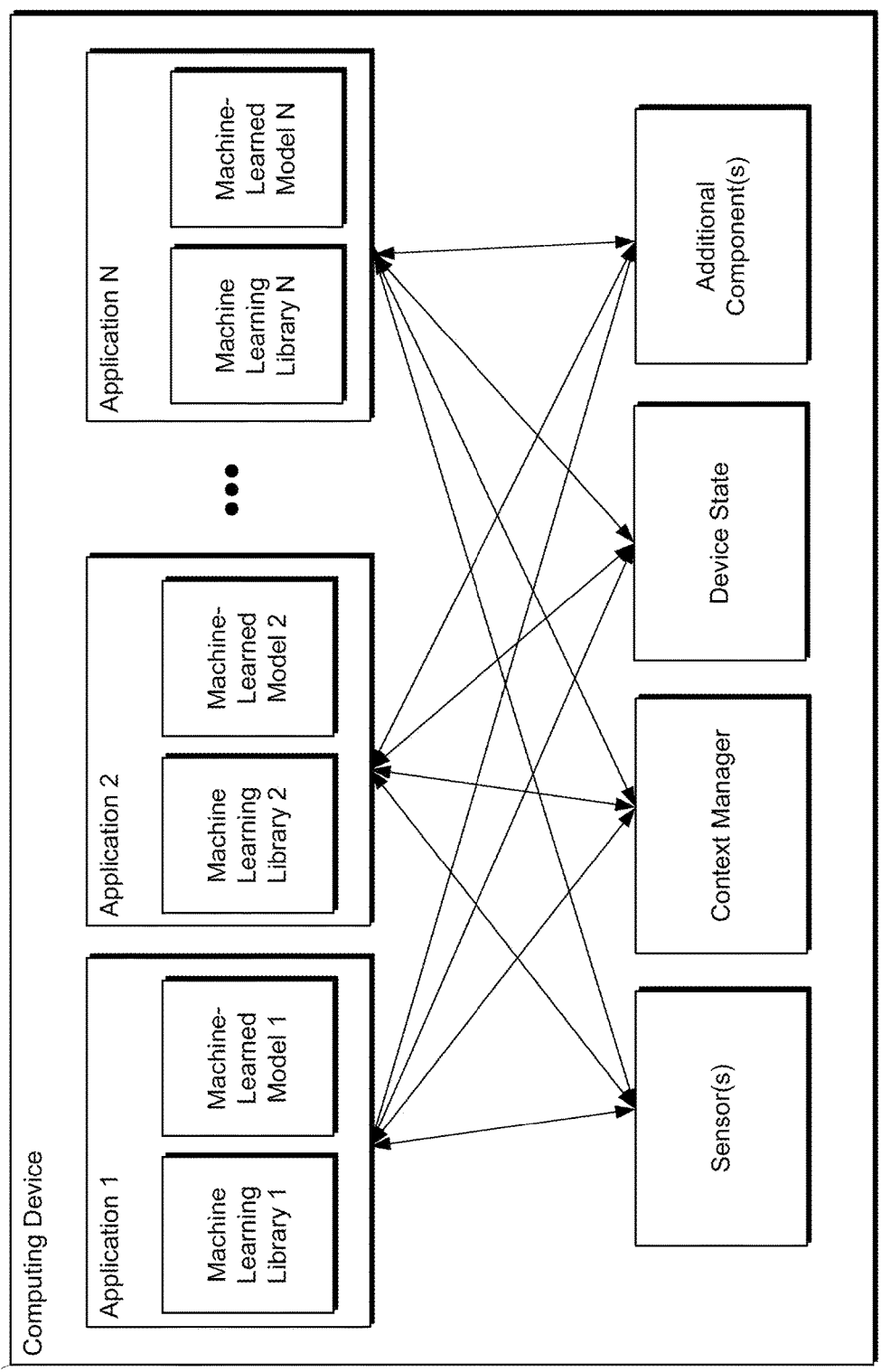
FIG. 1B depicts a block diagram of an example computing device that performs localization of objects encoded in image data in accordance with natural language queries according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
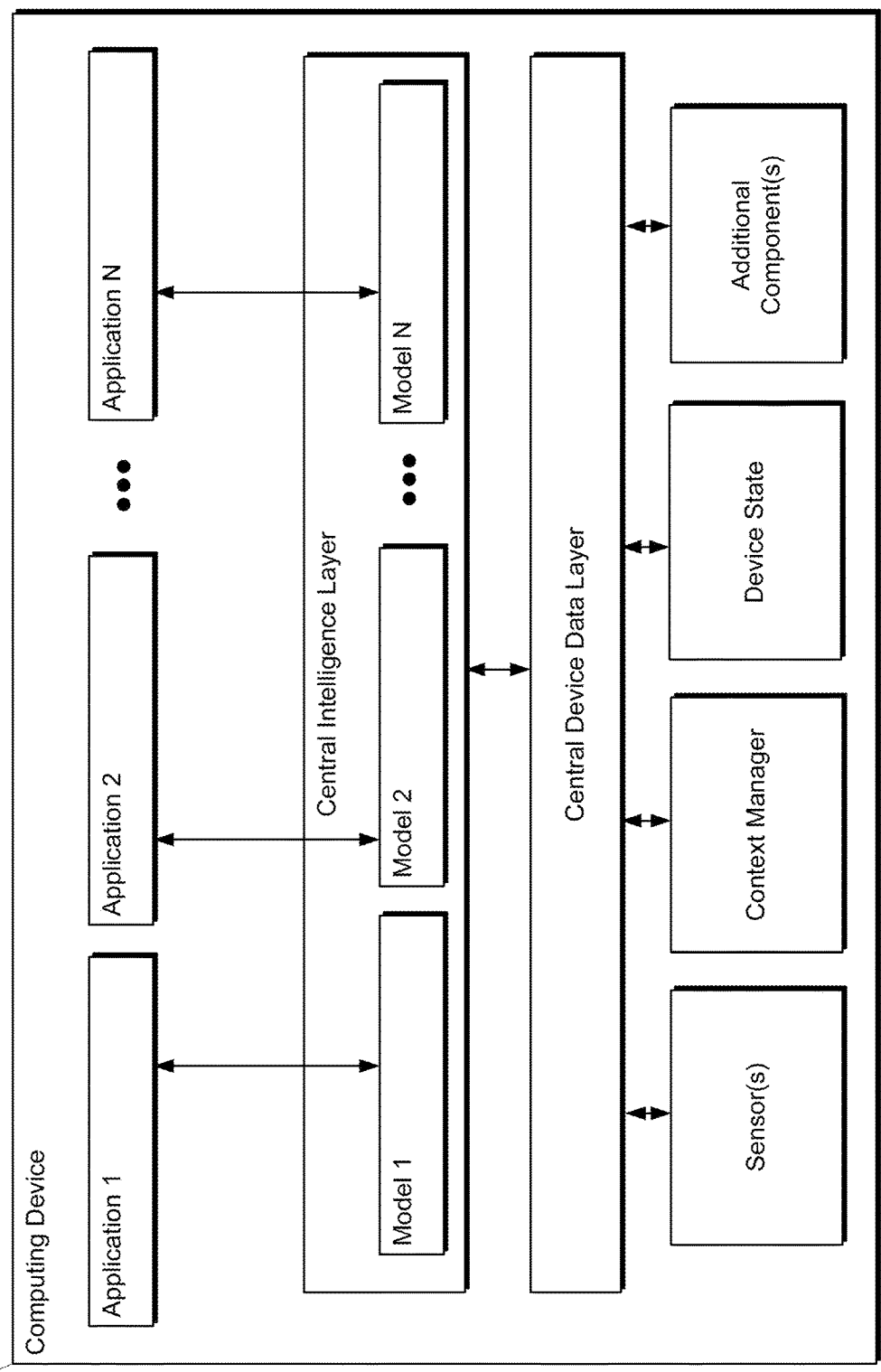
FIG. 1C depicts a block diagram of an example computing device that performs localization of objects encoded in image data in accordance with natural language queries according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Architecture Arrangements

As discussed above, natural language (NL) enables flexible descriptive queries about images. The interaction between text queries and images grounds linguistic meaning in the visual world, facilitating a stronger understanding of object relationships, human intentions towards objects, and interactions with the environment. Visual grounding has been studied through tasks including phrase grounding, object retrieval and localization, language-driven instance segmentation, and the like.

Among the most popular visual grounding tasks is referring expression com-prehension (REC), which localizes an object given a referring text. The REC task often requires complex reasoning on prominent objects. A related semantic localization task is object detection (DET), which seeks to detect all objects from a predefined set of classes without text inputs. In contrast to REC, the DET task requires the accurate classification and localization of small, occluded objects. At the intersection of the REC and DEC tasks is text-based localization (LOC), in which a simple category-based text query prompts the model to detect the objects of interest.

Due to their highly dissimilar task properties, other methods address REC, DET, and LOC tasks through separate other models that are each directed to only a single task. As a result, other models have not adequately synthesized information from the three tasks to achieve a more holistic visual and linguistic understanding. REC models, for instance, are trained to predict one object per image, and often struggle to localize multiple objects2, reject negative queries, or detect novel categories. In addition, other DET models are unable to process text inputs, and other LOC models often struggle to process complex queries such as "Chair bottom right on image". Lastly, none of the models can generalize sufficiently well beyond their training data and categories.

As also noted above, the embodiments (e.g., including the object localization system (OLS) framework and/or architecture) provides a unified visual localization approach. The OLS architecture includes a multi-level cross-modality fusion module (e.g., a unified model) which can perform complex reasoning for REC and simultaneously recognize small and challenging objects for LOC and DET. To unify the disparate demands of these tasks, the module efficiently fuses and learns features across many levels of abstraction. Concretely, the embodiments utilize the more expressive cross-attention fusion on lower resolution features, and the more efficient product fusion on higher resolution features to combine the best of both worlds. The embodiments also include an object detector and are trained on detection losses that are sufficient and effective for REC, LOC, and DET tasks without a need for task-specific design and losses. The embodiments include an efficient end-to-end trainable model for unified visual grounding and object detection.

By learning REC, LOC, and DET tasks jointly in one unified model, the embodiments acquire a holistic and versatile capability for visual grounding, compared to single-task other models. Notably, the embodiments surpass the performance of other models directed towards one or more of REC, LOC, and DET tasks. Moreover, unlike other task-specific models, the embodiments accomplishes all three tasks in a single model that can respond flexibly to a wide range of referring expression and localization queries, solve the standard detection task, and generalize better to novel data and classes. In summary, our contributions are.

The embodiments (e.g., the OLS architecture) include a versatile framework for visual grounding and detection tasks. In contrast to other task-specific models the unified model of the embodiments can respond flexibly to a wide range of referring expression and localization queries, solve the standard detection task, and generalize better to novel data and classes. The efficient multi-scale cross-attention fusion module (e.g., that implements the unified model) unifies the disparate task requirements between REC, LOC, and DET. Using the fused features, a standard detector and detection losses are effective for all tasks without a need for task-specific design or losses.

Figure 2A:
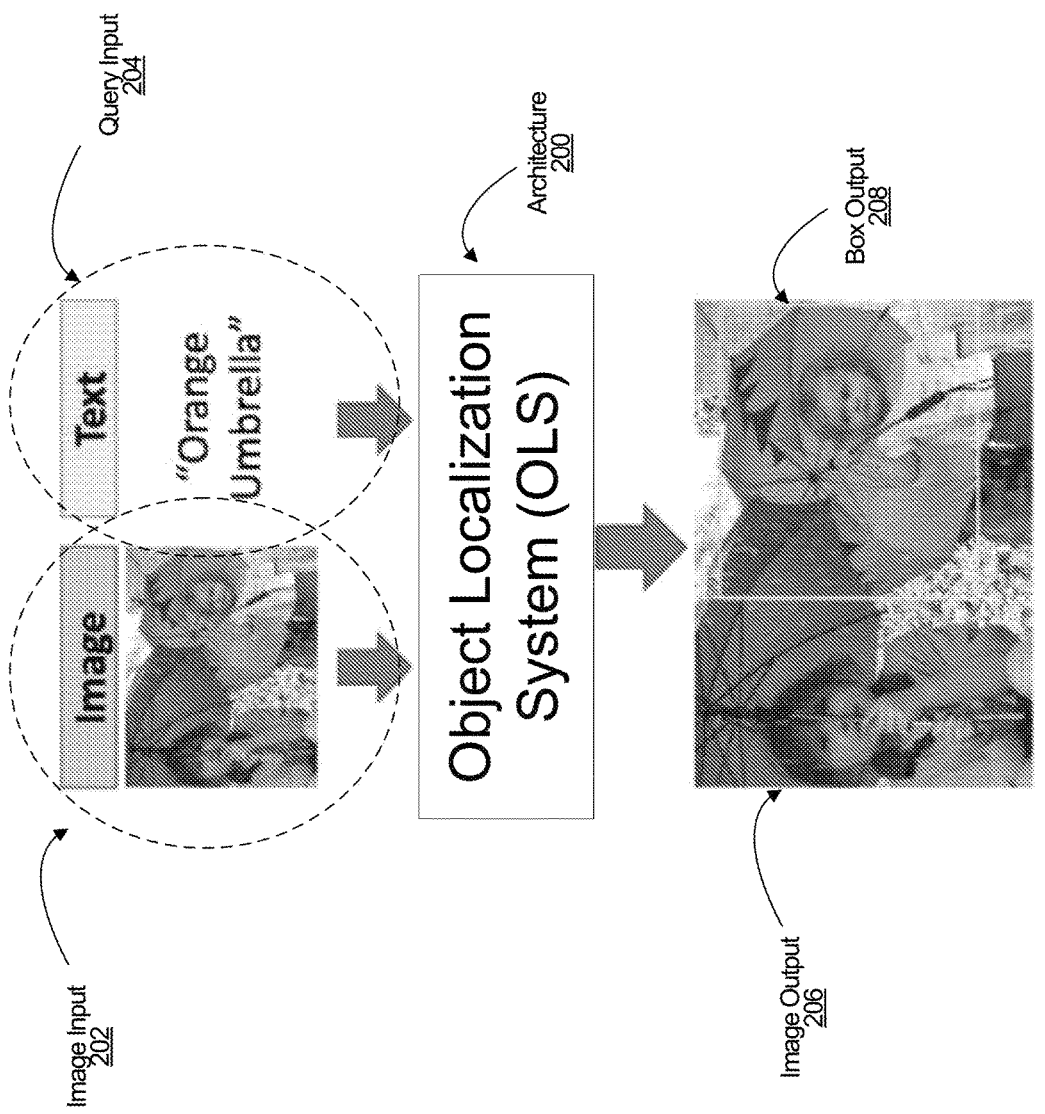
FIG. 2A shows the inputs and outputs of a non-limiting example architecture for a non-limiting example object localization system, according to various embodiments.

FIG. 2A shows the inputs and outputs of a non-limiting example architecture 200 for a non-limiting example object localization system (OLS), according to various embodiments. The architecture 200 for the OLS (e.g., the OLS architecture) may receive an image input 202 and a query input. The image input 202 may be in the form of image data (e.g., encoding two children, each of which is holding an umbrella) and the query input 204 may be in the form of text (e.g., "orange umbrella"). The output of the architecture 200 may be image output 206 and a box output 208, that surrounds the requested object in the query input 204.

Figure 2B:
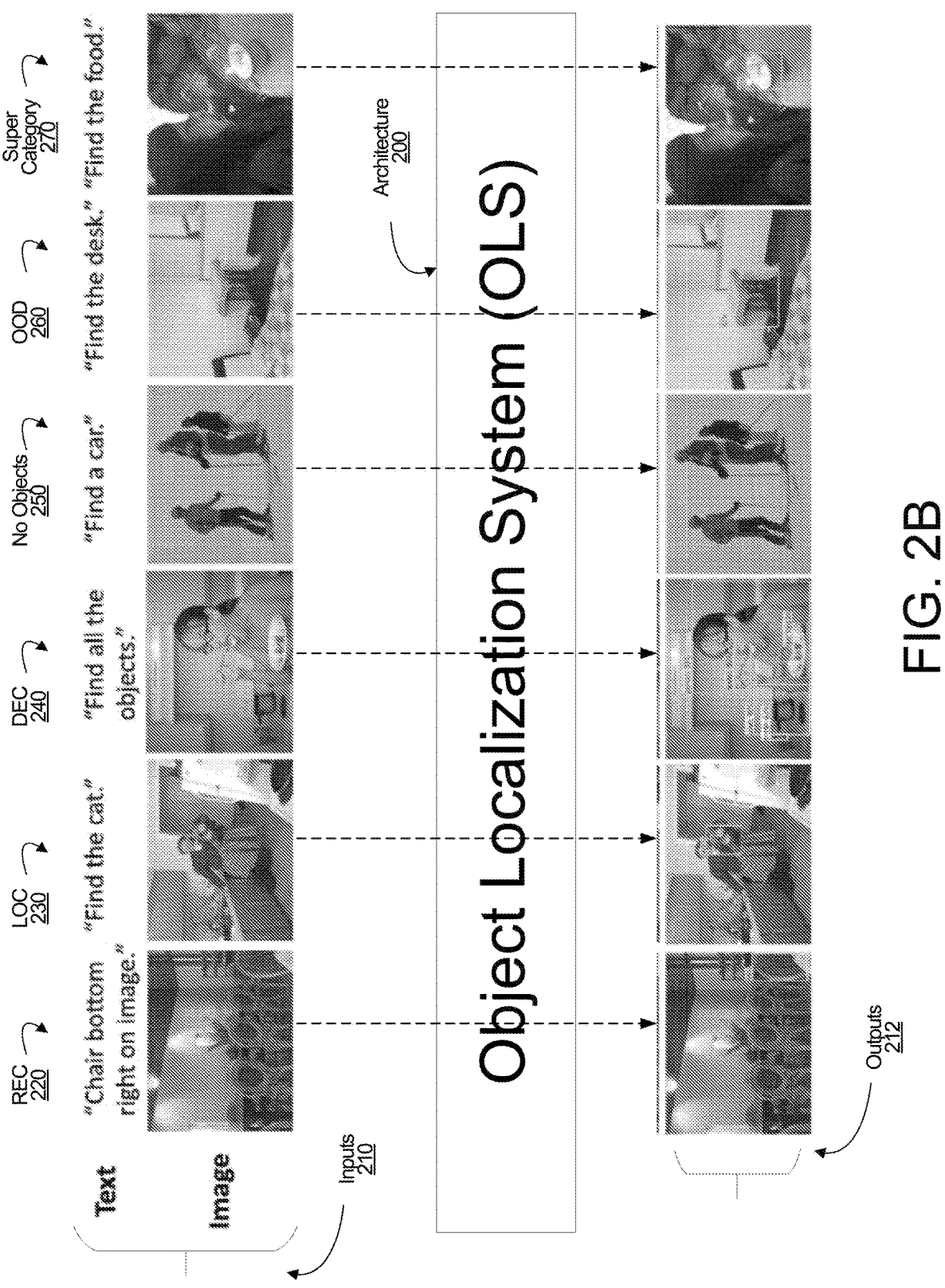
FIG. 2B depicts multiple tasks enabled by the various embodiments.

FIG. 2B depicts multiple tasks enabled by the various embodiments. FIG. 2B shows six columns of text and image inputs 210 being provided to the OLS architecture 200. FIG. 2B also shows six corresponding outputs 212 for the inputs (e.g., correspondence between the inputs 210 and the outputs 212 indicated by the dashed arrows). The first column corresponds to a REC task 220. As noted above, a referring expression comprehension (REC) task receives inputs including an image and a user query about a specific (often prominent) object in the image (e.g., "chair bottom right on image"). The expected output is one bounding box around the correct object. While natural queries may invoke multiple objects, this task may be limited to providing a single box as an answer.

The second column corresponds to a LOC task 230. In the text-based localization tasks, inputs include an image and a query about a category, e.g. "Find the cat". The expected output is a set of bounding boxes around all objects in that category. The task challenges the model to only predict the relevant objects based on the query.

The third column corresponds to a DEC task 240. In the detection (DET) tasks, inputs are an image and a standard query, e.g., "Find all the objects". The expected outputs are bounding boxes around the objects of categories present in the dataset and their classes. In some embodiments, the architecture 200 can generalize to novel categories via text-based localization. Thus, sharing the same vision and language interface with the other tasks may be enabled.

The fourth column corresponds to a "no objects" task 250, where the object indicated in the text input query is not found in the input image, and hence no bounding box is found. The fifth column corresponds to an out-of-distribution (OOD) 260 task, where novel category names, (e.g. "desk", where "dining table)" are the closest category in the training set. The sixth column corresponds to a "super category" task 270, where the input query includes a broad category name, (e.g., "food").

Figure 3:
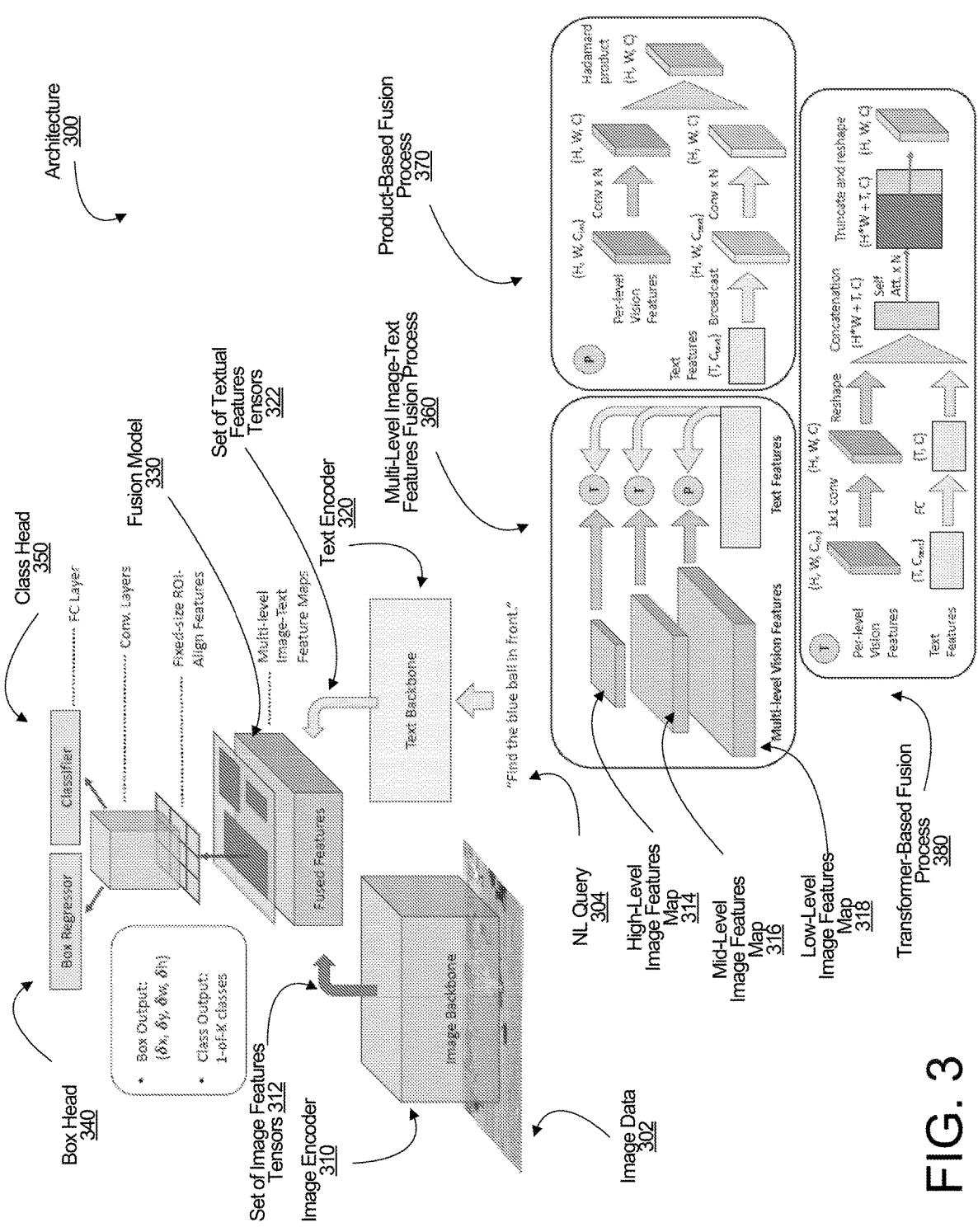
FIG. 3 depicts a block diagram of an example architecture according to non-limiting embodiments of the present disclosure.

FIG. 3 depicts a block diagram of an example architecture 300 according to non-limiting embodiments of the present disclosure. In some implementations, various models of the architecture 300 are trained via various supervised and/or unsupervised machine learning techniques. The architecture 300 may be similar to the architecture 200 of FIGS. 2A-2B. Thus, as discussed throughout, the architecture 300 may receive image data 302 and a natural language (NL) query 304 (e.g., "Find the blue ball in front") as inputs. The architecture 300 includes an image encoder 310, a text encoder 320, a fusion model 330, one or more box heads 340, and one or more class heads 350. The one or more box heads 340 and/or the one or more class heads 350 may be implemented by a decoder model. The one or more box heads 340 (or the decoder model) may include one or more box regressors (e.g., box regressor models). The one or more classed heads 350 (or the decoder model) may include one or more classifiers (e.g., classifier models).

The image encoder 310 may be an image backbone that encodes the input image data 302 in one or more image-features tensors (e.g., a 2D image features map or an image features vector). The one or more image features tensors are shown as a set of image features tensors 312 in FIG. 3. The set of image features tensors 312 may include at least a high-level image features map 314, a mid-level image features map 316, and a low-level image features map 318. As noted above, these image features map may be encoded via a image features tensor of the set of image features tensors 312. The text encoder 320 may be a text backbone that encodes the NL query 304 in one or more text-features tensors (e.g., a 2D text features map or a text features vector). The one or more text-features tensors are shown as a set of textual features tensors 320 in FIG. 3.

The fusion model 330 (or feature fusion model) may "fuse" or concatenate at least one of the one or more image features tensors with at least one of the one or more textual features tensors to generate one or more fused features tensors. The one or more fused features tensors may be a set of fused feature tensors. The fusing of the features via the fusion model 330 is a multi-level image-text fusion process 360 (as shown in the inset 360). As discussed further below, the inset 370 shows a non-limiting embodiment of a product-based fusion process 370 for low-level image features map 318. The inset 380 shows a non-limiting embodiment of a transformer-based fusion process 380 for mid-level image features map 316 and high-level image features map 314.

The one or more box heads 340 may determine one or more bounding boxes based on the fused features and the one or more class heads may generate one or more classifications for various objects depicted in the image data 302 based on the fused features and the NL query 304. The decoder model (via the box regressor 340) generates a set of bounding boxes, where each bounding box may be parameterized by the set of parameters: $(\delta_x, \delta_y, \delta_w, \delta_h)$. The decoder model (via the classifier 350) may generate class outputs for each object depicted in the image data 302 according to 1 of K classes. All models and/or architecture parameters may be share amongst the REC, DET, and LOC tasks, i.e. architecture 300 does not require task-specific parameters.

The image encoder 310 may be a ResNet backbone (or model) which yields multi-level features. The text encoder 320 may be a T5 transformer model, which encodes the NL query 304 as a series of token features. The fusion model 330 fuses (e.g., concatenates) the multi-level image features with token features, as shown in insets 360, 370, and 380. The image and text features are fused at the image level, as it allows more flexibility to adapt visual representation to various queries. After the fusion, a region proposer, as well as the box heads 340 and/or the class heads 360 may be applied. The architecture 300 may handle any task that predicts multiple objects and their classes given the image data 302 and the NL query 304. The unification approach may be agnostic to the choice of detectors and other detectors are also viable.

To combine the REC, DEC, and LOC tasks, one major challenge is that they are created around different domains and with different goals. For example, the referring expression task primarily references prominent objects in the image rather than small, occluded, or faraway objects such that low resolution images would suffice. In contrast, the detection task aims to detect objects with various sizes and occlusion levels in higher resolution images. Apart from these benchmarks, the general visual grounding problem is inherently multiscale, as natural queries can refer to objects of any size. This motivates the embodiments' multi-level image-text fusion model (e.g., fusion model 330) for efficient processing of higher resolution images over different localization tasks.

The fusion model 330 fuses (e.g., concatenates) multilevel image features with the text features using a Transformer-based cross attention module, as shown in inset 380. The vision features (or image features) at each level are fused with the text features (or textual features). A feature pyramid fuses features across resolutions by progressively up-sampling the higher level fused features to the resolution of lower level features.

The transformer fusion works as follows (e.g., see inset 380). The embodiments may first use a linear layer to project the vision and text features into the same dimension at each level. Next, the embodiments may collapse the spatial dimension of vision features into a sequence and concatenate it with the text sequence features. The embodiments may compute the relative position bias based on the total length of the concatenated sequence before applying the self-attention layers. Some embodiments may then apply product fusion (e.g., see inset 370) for the early high resolution feature maps (i.e. F2 and F3), and use self-attention for the smaller, higher level feature maps (i.e. F4 and F5). The embodiments may truncate and reshape the fused features to the same spatial dimensions as the input vision features.

The three localization tasks (e.g., REC, LOC, and DET tasks) may be unified in terms of model, loss, and inputs so they can be trained together. The implications of unification are significant. First, all tasks can share the same model during both training and inference time. Second, the unification of inputs and loss enables efficiently training on multiple datasets. Lastly, the models of architecture 300 can leverage information from other tasks, which allows the transfer of visual concepts and enables zero-shot applications. For example, the models may learn long-tail concepts from the referring expression task and transfer them to other localization tasks.

Apart from the unified architecture 300, training datasets may be adapted to the different tasks as follows. For the localization task, detection training datasets may be adapted by generating a set of queries over the categories present in the image. For any present category, the text query may take the form "Find the X" where X is the category name. The objects corresponding to that category are labeled as foreground and the other objects as background. At training time, a text query and corresponding objects from each image may be randomly sampled. For the detection task, detection training datasets may be adapted by adding a static task prompt such as "Find all the objects".

After adaptation, all tasks in consideration may share the same inputs and outputs, i.e., an image input, a text query, and a set of output bounding boxes/classes. Training may continue by combining the datasets and train on the mixture. At training time, a mixing ratio of 1:1:1 between DET/LOC/REC tasks may be employed in each minibatch. To ensure each dataset is sampled adequately, a larger batch size of 256 split among the 3 tasks may be used. To make the image size uniform across tasks the LOC task's image size may be set to 640 as a middle ground. This may be larger but comparable to the image size of REC task. It may be smaller than the size of DET task's images.

Also during training, the losses of all tasks may be unified and/or combined. The losses used may be box classification and/or regression loss, region proposal classification and regression loss, and weight decay. The loss formulation and relative weights follow without any task-specific modification. All losses may have equal (or unequal) weights across tasks.

The architecture 300 may use a region proposer, class predictor, and/or a class-agnostic box regressor shared among all tasks. The class decoder may have the same number of outputs as the detection vocabulary size (i.e. 80), as it primarily serves the detection task.

The image encoder 310 may be initialized from the ResNet50 model pretrained on COCO detection. The text encoder 320 may be initialized from T5-base pretrained checkpoint. All other modules (or models) may be trained from scratch, including the multi-level fusion model, feature pyramid network, the region proposal network (RPN) and the box/class decoders (e.g., box head 340 and/or class head 350). All hyper-parameters of the feature pyramid, RPN and box/class decoder heads may follow the Faster R-CNN.

The batch size may be set to 256 split among 3 tasks DET/LOC/REC with mixing ratio 1:1:1 in the minibatch. The ratio may be chosen for simplicity and has room for further optimization. The model may be trained for 150 k steps on a learning rate of 0.08, linear warmup of 500 steps, and a decay factor of 0.1 at 70% and 90% of the training schedule The learning rate of the pretrained image encoder and text encoder may be set to be about 10% of the rest of the model which may be trained from scratch.

random scale jittering uniformly sampled between [0.4, 2.5] for every input image. The image is padded or randomly cropped to the size of (640, 640) after the scale jittering. For the ablation studies, we reduce the scale jittering magnitude to [0.8, 1.25] due to the shorter training. For detection and text-based localization tasks we also apply random horizontal flip following the standard protocol [67]. In addition, we tokenize the text with SentencePiece [39] following T5 [65] and set the maximum expression length to 64 for all tasks.

A random scale jittering uniformly sampled between [0.4, 2.5] may be applied for every input image. The image may be padded or randomly cropped to the size of (640, 640) after the scale jittering For detection and text-based localization tasks, a random horizontal flip following the standard protocol may be. In addition, the text may be tokenized with SentencePiece following T5 and set the maximum expression length to 64 for all tasks.

Example Methods

FIG. 4 depicts a flow chart diagram of an example method 400 to perform localization of objects encoded in accordance with natural language queries, according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At block 402, a computing system may generate a set of image features tensors (e.g., set of image features 312 of FIG. 3). The set of image features tensors may include at least a first image features tensor. Generating the set of image features tensors may be based on image data (e.g., image data 302 of FIG. 3) encoding an image and an image features model (e.g., image encoder 310).

At block 404, the computing system may generate a set of textual features tensors (e.g., set of textual features tensors 322 of FIG. 3). The set of textual features may include at least a first textual features tensor. Generating the set if textual features may be based on a text-based query (e.g., NL query 304 of FIG. 3) and a textual features model (e.g., text encoder 320 of FIG. 3). At least a first object depicted in the image may correspond to the text-based query.

At block 406, the computing system may generate a set of fused features tensors (e.g., see inset 360 of FIG. 3). The set of fused features may include at least a first fused features tensor. Generating the set of fused features may be based on a feature fusion model (e.g., the fusion model 330 of FIG. 3), the set of image features tensors, and the set of textual features tensors. At least one of the image and the text-based query indicate a referring expression comprehension (REC) task. At least one of the image and the text-based query indicate a text-based localization (LOC) task. At least one of the image and the text-based query indicate a detection (DET) task.

At block 408, the computing system may determine a set of bounding boxes. The set of bounding boxes may include at least a first bounding box. Determining the set of bounding boxes may based on a decoder model (e.g., the box regressor 340 of FIG. 3 and/or the classifier 350 of FIG. 3) and the set of fused features tensors. That is, the decoder model may include a box regressor model and a classifier model. When the first bounding box is positioned on the image, the first bounding box may encompass the first object that corresponds to the text-based query (e.g., see FIG. 2).

At block 410, the computing system may provide an indication of at least the first bounding box (e.g., see FIG. 2).

In some embodiments, the set of image features tensors may include a second image features tensor that encodes a low-level features map (e.g., low-level image features map 318 of FIG. 3) for the image and the first image features tensor encodes a high-level features map (e.g., high-level image features maps 314 of FIG. 3) for the image. The high-level features map may be a first 2D map for the image. The low-level features map may be a second 2D features map for the image that is larger than the first 2D features maps. The first 2D features map may encode a first set of features for the image. The second 2D features map may encode a second set of features for the image. The second set of features for the image may be in a higher resolution than the first set of features for the image. The set of image features tensors may include a third image features tensor that encodes a mid-level features map for the image (e.g., mid-level image features map 316 of FIG. 3).

In some embodiments, the set of fused features tensors may include a second fused features tensor that is a low-level fusion of the second image features tensor and the first textual features tensor (e.g., see inset 370 of FIG. 3). The first fused features tensor may be a high-level fusion of the first image features tensor and the first textual features tensor (e.g., see inset 380 of FIG. 3). The method may further include the computing system generating the first fused features tensor based on the high-level features map for the image, the first textual features tensor, and a transformer-based fusion process (e.g., see inset 380) implemented by the feature fusion model. The transformer-based fusion process includes a cross-attention mechanism between the high-level features map for the image and the first textual features tensor.

The transformer-based fusion process (e.g., see inset 380) may include employing a linear layer of the fusion model to project the high-level features map for the image and the first textual features tensor onto a common dimension. The method may further include the computing system collapsing a spatial dimension of the high-level feature maps into a sequence. The computing system may generate a concatenated sequence by concatenating the sequence with the first textual features tensor. The computing system may compute a relative position bias based on a total length a total length of the concatenated sequence. The computing system may apply a self-attention (or a cross-attention) mechanism to the concatenated sequence based on the relative position bias. The computing system may then determine the first bounding box based on applying the self-attention (or cross-attention) mechanism to the concatenated sequence.

In some embodiments, the method includes the computing system generating the second fused features tensor based on the low-level features map for the image, the first textual features tensor, and a product-based fusion process implemented by the feature fusion mode (e.g., see inset 370). The product-based fusion process may include a product-based attention mechanism between the low-level features map for the image and the first textual features tensor.

In some embodiments, the method may further include the computing system reshaping the first fused features tensor to match a set of spatial dimensions of the first image features tensor. The computing system may determine the first bounding box based on the reshaped first fused features tensor. Reshaping the first fused features tensor may include reshaping the first fused features tensor the match the set of spatial dimensions of the first image features tensor.

Figure 5:
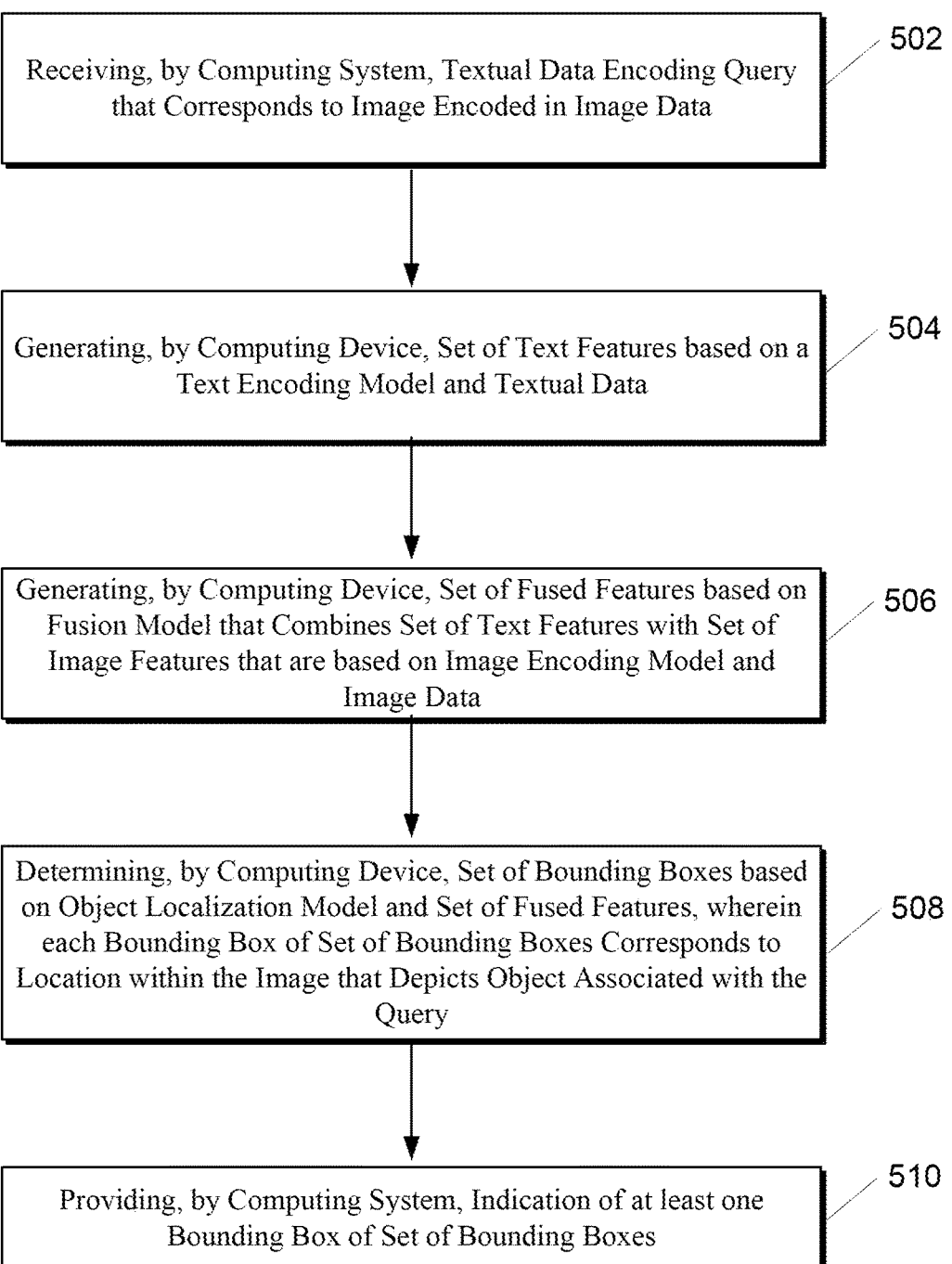
FIG. 5 depicts a flow chart diagram of another example method to perform localization of objects encoded in accordance with natural language queries, according to example embodiments of the present disclosure.

FIG. 5 depicts a flow chart diagram of another example method 500 to perform localization of objects encoded in accordance with natural language queries, according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At block 502, a computing system receives textual data encoding a query that corresponds to an image encoded in image data. At block 504, the computing device generates a set of text features based on a text encoding model and the textual data. At block 506, the computing device generates a set of fused features based on a fusion model. The fusion mode combines the set of text features with a set of image features that are based on an image encoding model and the image data. At block 508, the computing device determines a set of bounding boxes based on an object localization model and the set of fused features. Each bounding box of the set of bounding boxes corresponds to a location of the image that depicts an object associated with the query. At block 510, the computing system provides an indication of at least one bounding box of the set of bounding boxes.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
   receiving, by a computing system, textual data encoding a query that corresponds to an image encoded in image data;
   generating, by the computing device, a set of text features based on a text encoding model and the textual data;
   generating, by the computing device, a set of fused features based on a fusion model that combines the set of text features with a set of image features that are based on an image encoding model and the image data, wherein the set of image features includes first image features that encode a high-level features map for the image and second image features that encode a low-level features map for the image;

determining, by the computing device, a set of bounding boxes based on an object localization model and the set of fused features, wherein each bounding box of the set of bounding boxes corresponds to a location of the image that depicts an object associated with the query; and
   providing, by the computing system, an indication of at least one bounding box of the set of bounding boxes.

2. The computer-implemented method of claim 1, wherein the set of fused features tensors includes a first fused features tensor that encodes a high-level fusion of the first image features and the first textual features tensor and a second fused features tensor that encodes a low-level fusion of the second image features and the first textual features tensor.

3. The computer-implemented method of claim 2, wherein the method further comprises:
   generating, by the computing system, the first fused features tensor based on the high-level features map for the image, the first textual features tensor, and a transformer-based fusion process implemented by the feature fusion model.

4. The computer-implemented method of claim 3, wherein the transformer-based fusion process includes a cross-attention mechanism between the high-level features map for the image and the first textual features tensor.

5. The computer-implemented method of claim 3, wherein the transformer-based fusion process includes employing a linear layer of the fusion model to project the high-level features map for the image and the first textual features tensor onto a common dimension.

6. The computer-implemented method of claim 5, wherein the method further comprises:
   collapsing, by the computing system, a spatial dimension of the high-level feature maps into a sequence;
   generating, by the computing sequence, a concatenated sequence by concatenating the sequence with the first textual features tensor;
   computing, by the computing system, a relative position bias based on a total length a total length of the concatenated sequence; and
   applying, by the computing system, a self attention mechanism to the concatenated sequence based on the relative position bias; and
   determining, by the computing system, the first bounding box based on applying the self attention mechanism to the concatenated sequence.

7. The computer-implemented method of claim 2, wherein the method further comprises:
   generating, by the computing system, the second fused features tensor based on the low-level features map for the image, the first textual features tensor, and a product-based fusion process implemented by the feature fusion mode.

8. The computer-implemented method of claim 7, wherein the product-based fusion process includes a product-based attention mechanism between the low-level features map for the image and the first textual features tensor.

9. The computer-implemented method of claim 1, wherein the high-level features map is a first 2D map for the image and the low-level features map is a second 2D features map for the image that is larger than the first 2D features maps.

10. The computer-implemented method of claim 9, wherein the second 2D features map is in a higher resolution than the first 2D features map.

11. The computer-implemented method of claim 10, wherein the set of image features includes third image features that encode a mid-level features map for the image.

12. The computer-implemented method of claim 1, wherein at least one of the image and the text-based query indicate a referring expression comprehension (REC) task.

13. The computer-implemented method of claim 1, wherein at least one of the image and the text-based query indicate a text-based localization (LOC) task.

14. The computer-implemented method of claim 1, wherein at least one of the image and the text-based query indicate a detection (DET) task.

15. The computer-implemented method of claim 1, wherein the object localization model comprises a decoder model that includes a box regressor model and a classifier model.

16. The computer-implemented method of claim 1, further comprising:

reshaping, by the computing system, a first fused features tensor of the set of fused features to match a set of spatial dimensions of the first image features of the set of image features; and determining, by the computing system, a first bounding box of the set of bounding boxes based on the reshaped first fused features tensor.

17. The computer-implemented method of claim 1, further comprising:

generating the set of image features based on the image encoding model and the image data.

18. A computing system, comprising:

one or more processors; and one or more non-transitory computer-readable media that store instructions that when executed by the one or more processors, cause the computer system to perform operations, the operations comprising:

generating a set of image features tensors based on image data encoding an image and an image features model, wherein the set of image features tensors includes first image features that encode a high-level features map for the image and second image features that encode a low-level features map for the image;

generating a set of textual features tensors, which includes at least a first textual features tensor, based on a text-based query and a textual features model, wherein at least a first object depicted in the image corresponds to the text-based query;

generating a set of fused features tensors, which includes at least a first fused features tensor, based on a feature fusion model, the set of image features tensors, and the set of textual features tensors;

determining a set of bounding boxes, which includes at least a first bounding box, based on a decoder model and the set of fused features tensors, wherein when the first bounding box is positioned on the image, the first bounding box encompasses the first object that corresponds to the text-based query; and providing an indication of at least the first bounding box.

19. One or more tangible non-transitory computer-readable media storing computer-readable instructions that when executed by one or more processors cause the one or more processors to perform operations, the operations comprising:

generating a set of image features tensors based on image data encoding an image and an image features model, wherein the set of image features tensors includes first image features that encode a high-level features map for the image and second image features that encode a low-level features map for the image;

generating a set of textual features tensors, which includes at least a first textual features tensor, based on a text-based query and a textual features model, wherein at least a first object depicted in the image corresponds to the text-based query;

generating a set of fused features tensors, which includes at least a first fused features tensor, based on a feature fusion model, the set of image features tensors, and the set of textual features tensors;

determining a set of bounding boxes, which includes at least a first bounding box, based on a decoder model and the set of fused features tensors, wherein when the first bounding box is positioned on the image, the first bounding box encompasses the first object that corresponds to the text-based query; and providing an indication of at least the first bounding box.

* * * * *